Aug. 12, 1952    C. D. WALCOT ET AL    2,606,568
CRUTCH TIP
Filed April 3, 1950
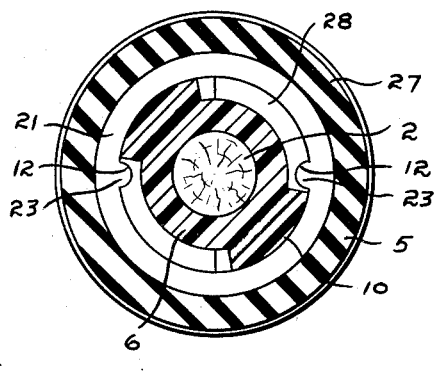
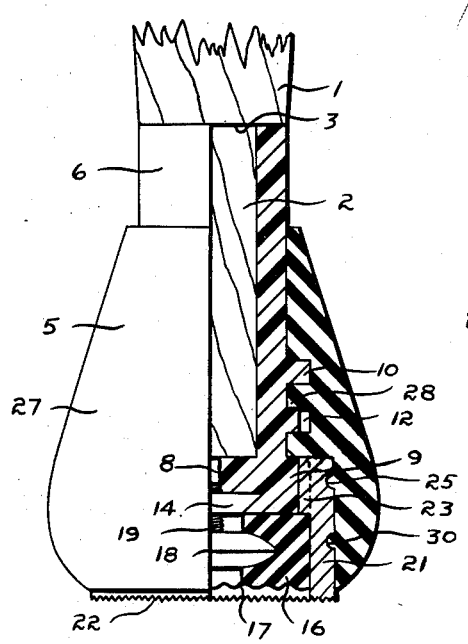
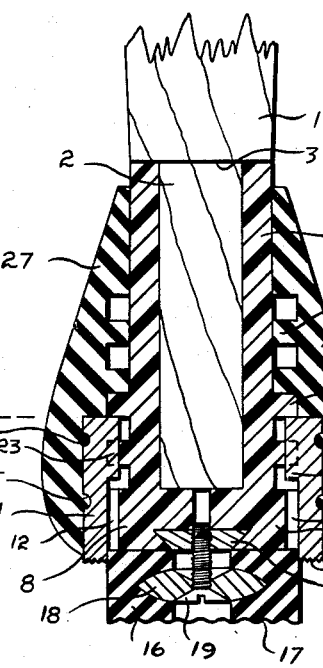
INVENTORS
CHARLES D. WALCOT
JOHN ERIC ROALD OSTROM
ATTORNEY Patented Aug. 12, 1952

2,606,568

UNITED STATES PATENT OFFICE 2,606,568

CRUTCH TIP

Charles D. Walcot and John Eric Roald Ostrom, Bamfield, British Columbia, Canada Application April 3, 1950, Serial No. 153,612

3 Claims. (Cl. 135—53)

Our invention relates to improvements in crutch tips.

A person using a pair of crutches fitted with the conventional rubber tips will occasionally encounter a stretch of ground upon which the crutches have a tendency to slip. This may be due to the weather conditions prevailing at the time so that while a rubber tip will normally afford adequate protection against slippage, snow or ice covered ground cannot be traversed in safety.

It is therefore the particular object of this invention to provide a crutch tip having two ground engaging members, one a resilient rubber pad and the other a positive non-slip element, either of which may be selectively used as required. Further objects will become apparent in the following specification and accompanying drawings, in which:

Figure 1 is a vertical sectional view of the invention showing the rubber pad in ground engaging position.

Figure 2 is a vertical half sectional view of the invention showing the non-slip element in ground engaging position.

Figure 3 is a sectional plan view taken on the line 3—3 of Figure 1.

In the drawings like characters of reference indicate corresponding parts in each figure.

The numeral 1 indicates a crutch having a reduced lower end 2 provided with a shoulder 3. A tip, generally indicated by the numeral 5, is adapted to be fitted to the lower end 2 of the crutch and is provided with a socket 6 of plastic, hard rubber, or other suitable material, which abuts the shoulder 3. The socket 6 is provided with an end closure 8 having an outer flange 9 and above said flange is a male thread 10, which in this exemplification is shown as a double square thread. The outer flange 9 and the lower thread 10 are provided with circumferentially spaced vertical guide slots 12 and embedded in the end closure 8 is a centrally disposed metal nut 14.

A circular rubber pad 16 having a serrated bottom face 17 is moulded about a metal washer 18 and is secured to the end closure 8 of the socket by a screw 19 which extends through said washer and threadedly engages the nut 14.

The socket 6 is fitted with an endwise movable sleeve 21 having a knurled lower rim 22. The sleeve 21 is provided with vertical ribs 23 which are slidable in the guide slots 12 and serve to prevent rotation of said sleeve about the socket 6. Vertically spaced circumferential grooves 25 are provided on the outer periphery of the sleeve 21.

The tip 5 is fitted with an elongated rubber nut 27 having a female thread 28 adapted to engage the thread 10 of the socket and said nut is provided with spaced circumferential ribs 30 which ride in the grooves 25 as the nut is rotated to advance the sleeve 21 endwise of said socket.

As shown in Figure 1, the rubber pad 16 projects into ground engaging position, which would normally be the position of use as the crutch user travels over non-slippery ground. If slippery ground is encountered the nut 27 is given a partial turn in the appropriate direction to project the sleeve 21 beyond the pad as shown in Figure 2. The knurled rim 22 of the sleeve will then contact the ground and provide an adequate grip on the ground surface to ensure the user's safety.

What we claim as our invention:

1. A tip for a crutch or the like comprising a socket adapted to receive an end of said crutch, a rubber pad secured to the lower end of said socket, a non-rotatable ground engaging sleeve endwise movable upon said socket, and a resilient member rotatably mounted upon said socket for projecting an end of the sleeve beyond the pad.

2. A tip for a crutch or the like comprising a socket adapted to receive an end of said crutch, a resilient pad secured to the lower end of said socket, a sleeve slidable relative to said socket, a rubber nut threadedly engaging said socket to project the sleeve into ground engaging position beyond the pad, said nut serving also as a cushioning element for the sleeve.

3. A tip for a crutch or the like comprising a socket adapted to receive an end of said socket, a pad secured to the lower end of said socket, a sleeve slidable relative to said socket, rib and guide slot means for preventing relative rotation between the sleeve and the socket, a rubber nut threadedly engaging said socket having a recess adapted to receive said sleeve, said sleeve and nut having circumferential groove and rib means for preventing endwise movement of the sleeve within the recess as said nut is rotated to project the sleeve into ground engaging position beyond the pad.

CHARLES D. WALCOT.
JOHN ERIC ROALD OSTROM.

REFERENCES CITED

The following references are of record in the file of this patent:

UNITED STATES PATENTS

| Number | Name | Date |
|---|---|---|
| 483,174 | Scoville | Sept. 27, 1892 |
| 1,717,314 | Frantz | June 11, 1929 |
| 2,492,916 | Chute et al. | Dec. 27, 1949 |